United States Patent [19]

Shindo et al.

[11] 4,143,563
[45] Mar. 13, 1979

[54] HYDRAULIC CONTROL SYSTEM FOR USE IN AUTOMATIC TRANSMISSION

[75] Inventors: Yoshio Shindo; Hiroshi Ito, both of Toyota, Japan

[73] Assignee: Toyota Jidosha Kogyo Kabushiki Kaisha, Aichi, Japan

[21] Appl. No.: 825,374

[22] Filed: Aug. 17, 1977

[30] Foreign Application Priority Data

Mar. 1, 1977 [JP] Japan .................................. 52/20828

[51] Int. Cl.$^2$ ........................................... B60K 41/04
[52] U.S. Cl. ......................................... 74/867; 74/869
[58] Field of Search ................. 74/861, 867, 868, 869; 192/87.13, 87.18, 87.19, 109 F

[56] References Cited

U.S. PATENT DOCUMENTS

| | | | |
|---|---|---|---|
| 3,651,714 | 3/1972 | Ohya et al. | 74/869 X |
| 3,908,486 | 9/1975 | Mitamura et al. | 74/869 |
| 3,978,743 | 9/1976 | Murakami | 74/869 |
| 4,008,630 | 2/1977 | Murakami et al. | 74/869 X |

Primary Examiner—Edgar W. Geoghegan
Attorney, Agent, or Firm—Toren, McGeady and Stanger

[57] ABSTRACT

A hydraulic control system for use in an automatic transmission including a fluid coupling type torque converter, and a gear system provided with two or more frictional engaging devices adapted to establish two or more speed conditions. The hydraulic system further includes a hydraulic pressure source, a line pressure control valve for supplying a regulated line pressure, by receiving a hydraulic pressure from the hydraulic pressure source, a throttle pressure control valve for generating a throttle pressure commensurate with an intake throttle opening, a governor pressure control valve for generating a governor pressure commensurate with vehicle speed, a manual change-over valve for enabling manual change-over of the transmission, two or more shift valves for shifting the path of the line pressure to be supplied to the frictional engaging devices in response to abalancing of the relationship between the throttle pressure and the governor pressure, the shift valves including one shift valve operative to establish the highest speed ratio for the transmission, and a highest speed control device for controlling to a low-speed-side shift position the one shift valve of the aforementioned shift valves which is operative to establish the highest speed ratio irrespective of the governor pressure resulting when the intake throttle opening remains over a given valve.

7 Claims, 13 Drawing Figures

D-RANGE AUTOMATIC GEAR SHIFTING DIAGRAM

D-RANGE AUTOMATIC GEAR SHIFTING DIAGRAM

D-RANGE AUTOMATIC GEAR SHIFTING DIAGRAM

HYDRAULIC CONTROL SYSTEM FOR USE IN AUTOMATIC TRANSMISSION

BACKGROUND OF THE INVENTION

The present invention relates generally to a hydraulic control system for use in an automatic transmission, and more particularly to a hydraulic control system which is well adapted for use in an automatic transmission with overdrive means and which may operate to insure a driving force sufficient for a vehicle when the vehicle engine is driven at a full throttle opening.

Automatic transmissions in common use in automotive vehicles automatically provide optimum gear ratio change or shifting in response to vehicle speed and a throttle opening and as a result a driver need only depress an accelerator pedal and a brake pedal in order to effect appropriate vehicle operation including gear shifting. It has been general practice to provide a torque converter with a mechanical transmission mechanism for establishing three or four forward speed conditions, thereby effectively attaining torque conversion at a low speed drive as well. In this respect, the gear change ratios of a mechanical transmission may be automatically selected commensurate with the running condition of a vehicle. Typical of the mechanical transmission mechanisms is a planetary gear type transmission having a hydraulic control device. The hydraulic control device includes a throttle pressure valve adapted to provide a pressure (a system hydraulic pressure) proportional to an intake throttle opening of the vehicle engine, a governor pressure valve adapted to generate a pressure (governor pressure) commensurate with a rotational speed of an engine output shaft thereby detecting the speed of a vehicle, a change-over valve for providing a hydraulic pressure to a working cylinder in a frictional engaging device in the planetary gear type transmission, and a pressure regulating control valve for providing a hydraulic pressure (line pressure) variable depending on intake throttle opening and vehicle speed.

In a case where the gear change ratio is automatically established in accordance with intake throttle opening and vehicle speed, then the highest speed is maintained even if the accelerator pedal is fully depressed to its maximum extent at the highest speed gear shift position and at a high vehicle speed. With a multiple speed transmission, the total gear reduction ratio at the highest speed gear shift position is necessarily small. As a result, a sufficient driving force for the vehicle cannot be achieved within a vehicle speed range in which the highest speed is maintained, even if the acclerator pedal is fully depressed to its maximum extent, when a passing acceleration is required, when a driving force is required for normal road operation under specific conditions (upward load), or when acceleration for other purposes is required. Accordingly, there results lack of acceleration or decleration on an upward slope, with an accompanying lowering in the performance of the vehicle. This tendency is particularly prevalent with automatic transmission having overdrive means.

It is an object of the present invention to provide a hydraulic control system for use in an automatic transmission which provides improved acceleration performance at full opening of the throttle valve of the vehicle engine.

It is another object of the present invention to provide a hydraulic control system for a vehicle transmission wherein when a driver depresses an accelerator pedal, the transmission will not shift to the highest speed gear shift position at throttle openings over a given value, or the transmission shifts to a lower-speed-side shift position from the highest speed shift position thereby achieving a sufficient driving force for operation of the vehicle.

SUMMARY OF THE INVENTION

According to the present invention, there is provided a hydraulic control system for use in an automatic transmission, in which gear change is automatically effected commensurate with vehicle speed and throttle opening, the hydraulic control system being particularly characterized by a change-over valve adapted to change over a fluid path in the system depending upon a balancing of the relationship between a throttle pressure and a governor pressure developed in the system and to selectively supply pressure to frictional engaging means in a mechanical transmission utilized with the system. Change-over valve control means is provided for controlling the change-over valve in order to prevent shifting of the frictional engaging means from a low speed to a high speed position at throttle openings over a given value.

Contemplated as frictional engaging means which are employable with the present invention are devices such as a multiple disc clutch, a band brake and the like. Two or more piston-cylinder means are hydraulically operated to drive these frictional engaging means to release the engagement of desired elements in the planetary gear type transmission for selecting a change gear ratio. The hydraulic control system according to the present invention contemplates control of the supply of a hydraulic pressure to the aforesaid two or more piston-cylinder means.

The change-over valve control means may be provided by connecting the shift valve to a highest speed control means for controlling a governor pressure acting on the shift valve, by using a throttle pressure or by incorporating in the shift valve operating to establish the highest speed gear shift position a compression spring of a given spring force, whereby utilization may be made of the characteristic that the governor pressure does not vary at vehicle speeds over a given value. In the former case, a hysteresis shifting operation may be achieved for the upshift and downshift operations by providing lands of a spool with different diameters in the highest speed control means.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

The drawings depict an automatic transmission with overdrive means using a multiple disc clutch as frictional engagement means.

Figure 1:
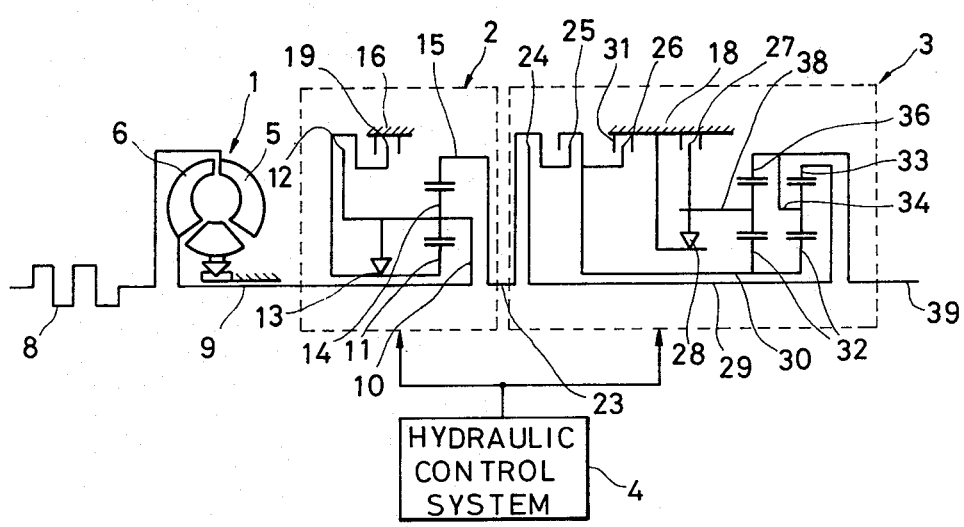
FIG. 1 is a schematic diagram of a vehicle transmission system adapted to embody the present invention.

FIG. 1 is a schematic longitudinal cross-sectional view of an automatic transmission according to the present invention, taken along a drive shaft. The system includes a torque converter 1, overdrive means 2, a three-forward speed, one-reverse speed planetary gear transmission 3, and a hydraulic control device 4. A pump impeller 5 in the torque converter is coupled to an engine crank shaft 8, and a turbine runner 6 is coupled to a turbine shaft 9 which is coupled to a carrier 10 in a planetary gear train within the overdrive means 2. A small size gear 14 which is rotatably supported in the carrier 10 meshes with a sun gear 11, and ring gear 15. Interposed between the sun gear 11 and the carrier 10 are a multiple disc clutch 12 and a one-way clutch 13, while a multiple disc brake 19 is interposed between a casing 16 and the sun gear 11. The ring gear 15 is coupled to an input shaft 23 in the planetary gear transmission 3. Interposed between the input shaft 23 and an intermediate shaft 29 and between the input shaft 23 and a sun gear shaft 30 are multiple disc clutches 24, 25, respectively. Interposed between the sun gear shaft 30 and a support 31 rigid with a transmission casing 18 is a multiple disc brake 26. The sun gear 32 mounted on the sun gear shaft 30 provides two-row planetary gear trains, while a ring gear in one train is coupled to the intermediate shaft 29, and a carrier 34 thereof and a ring gear 36 in the other train are coupled to an output shaft 39. In addition, interposed between the other carrier 38 and the transmission casing 18 are a multiple disc brake 27 and a one-way clutch 28.

The relative positioning between the planetary gear transmission 3 and hydraulic control device 4, is such that engagement and disengagement of respective clutch and brake means are effected by changing over or switching fluid paths for two or more shift valves in the hydraulic control device, in response to the output of the engine and to vehicle speed. Thus, there is established by the automatic transmission of the invention four forward speed gear ratios including an overdrive and a reverse one-speed gear ratio.

The gear shift positions of the automatic transmission and the operational conditions of clutches and brakes are shown in Table 1.

Table 1

| Gear shift position | | Clutch and brake | 12 | 13 | 19 | 24 | 25 | 26 | 27 | 28 |
|---|---|---|---|---|---|---|---|---|---|---|
| Forward | D-range | 1st speed | O | Δ | X | O | X | X | X | Δ |
| | | 2nd speed | O | Δ | X | O | X | O | X | X |
| | | 3rd speed | O | Δ | X | O | O | X | X | X |
| | | 4th speed (O/D) | X | X | O | O | O | X | X | X |
| | 2nd range | 1st speed | O | Δ | X | O | X | X | X | Δ |
| | | 2nd speed | O | Δ | X | O | X | O | X | X |
| | L-range | 1st speed | O | Δ | X | O | X | X | O | Δ |
| Rear (R-range) | | | O | Δ | X | X | O | X | O | X |

In Table 1, symbol (O) represents engagement of a clutch or brake, symbol (Δ) represents engagement of a clutch or brake when the vehicle is driven from the engine side, i.e., engine braking is released, and the symbol (X) represents the released condition of a clutch or brake. In addition, 4th speed represents an overdrive condition.

In the D-range in forward speed, shifting to 1st, 2nd, 3rd, and 4th gear ratios is accomplished automatically. In the second range, shifting to the 1st and 2nd gear ratios is accomplished automatically. In the L-range, only shifting to the 1st speed gear ratio is possible.

FIGS. 2 to 5 show hydraulic control circuits for the hydraulic control system 4 according to the present invention. The hydraulic control system includes two or more balance shift valves 49, 50, 51 which may be actuated depending on a balancing of the relationship between a throttle pressure and a governor pressure in order to accomplish change-over or switching of fluid paths leading to piston-cylinder means (not shown) in respective clutches and brake means. In this respect, the shift valve 49 will be hereinafter referred to as a 1-2 shift valve, the shift valve 50 as a 2-3 shift valve, and the shift valve 51 as a 3-4 (overdrive) shift valve, respectively. Change-over valves 79, 90 constituting a shift valve control device according to the present invention are provided in a governor pressure supply line 45c between the 2-3 shift valve 50 and the 3-4 shift valve 51, and in a supply line 44j leading from the 3-4 shift valve 51 to the brake 19, respectively. In addition, the hydraulic pressure control system 4 further includes: a throttle valve 46 adapted to generate a throttle pressure commensurate with the opening of the carburetor throttle; a governor valve 45 adapted to generate a governor pressure commensurate with vehicle speed; a regulator valve 43 adapted to generate a line pressure commensurate with vehicle speed and throttle opening by regulating the hydraulic pressure from a hydraulic pump 41 according to the throttle pressure and governor pressure; a manual valve 44 which enables change over or switching of the fluid path for the line pressure; a detent regulator valve 47 for the regulating line pressure to a pressure level lower than the line pressure and generating a detent pressure to be supplied to shift valves 49, 50, 51 through the throttle valve 46, when the throttle valve 46 is displaced to its maximum extent; and a low modulator valve adapted to be supplied with a line pressure when the transmission is shifted to 'L' range by means of a manual operation, thereby regulating the line pressure to a given pressure level required for control in the 'L' range.

Operation of the hydraulic pressure control device will be described with reference to FIGS. 2 to 5.

A hydraulic pressure from the oil pump 41 is regulated to a given pressure level in the regulator valve 43, and then fed to the clutch 12 via the manual valve 44, throttle valve 46, detent regulator valve 47 and 3-4 shift valve 51 through lines 41a, 41b, 41c, respectively. As seen from the drawings, the system includes a fluid reservoir 40.

When the manual valve 44 is set to the neutral position (N), the spool in the valve 44 assumes the upper one of two positions depicted in the drawings and a line pressure in the line 41a is blocked by the manual valve 44, so that line pressure is not supplied either to clutches other than the clutch 12, or any of the brake means.

When the manual valve 44 is set to the D-range position, the spool in the valve 44 assumes the lower position depicted in the drawings and line pressure in the line 41a is introduced into a line 44a, and then supplied via a line 44b to the 1-2 shift valve 49, while being supplied via a line 44d to the clutch 24 and then via a line 44e to the governor valve 45. As shown in Table 1, the clutch 24 establishes engagement in every range in the forward drive gear ratio positions. A throttle pressure Pth which has been regulated to a given pressure level in the throttle valve 46 is supplied via the lines 43a, 43b, to the 1-2 shift valve 49 and 2-3 shift valve 50, while being supplied via a line 43c to a shuttle valve 53, and then via a line 43d to the 3-4 shift valve 51.

Figure 2:
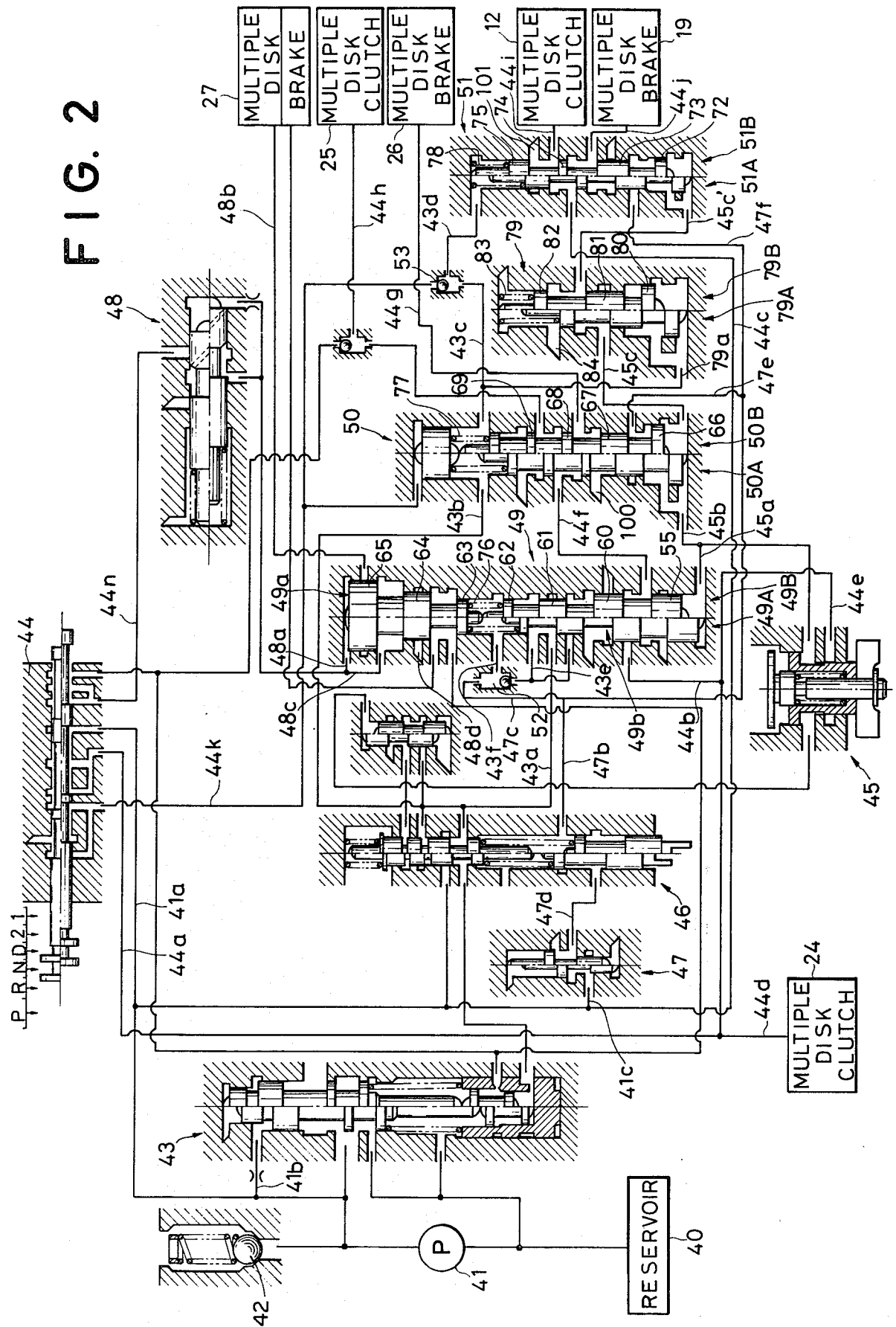
FIGS. 2 to 6 are diagrams of the hydraulic control system used in the embodiment of the invention.
Figure 3:
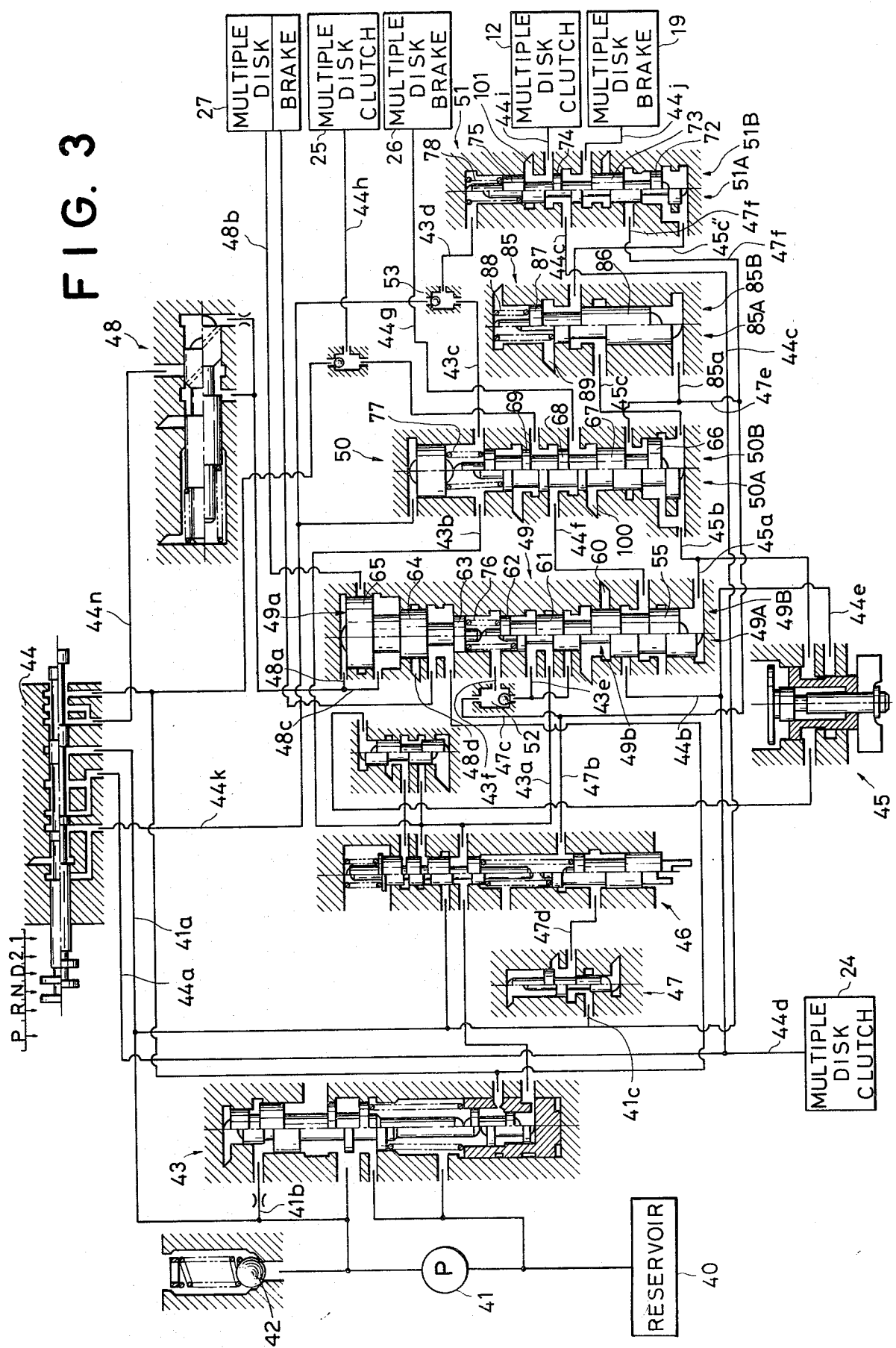

Referring to FIGS. 2 and 3, when a spool in a change-over valve 79 remains in the position 79A, depicted to the left of the valve in the drawings, a governor pressure Pgo which has been regulated to a given pressure level commensurate with vehicle speed in the governor valve 45 is then supplied via lines 45a, 45b, 45c to the 1-2 shift valve 49, 2-3 shift valve 50 and 3-4 shift valve 51, respectively.

Figure 5:
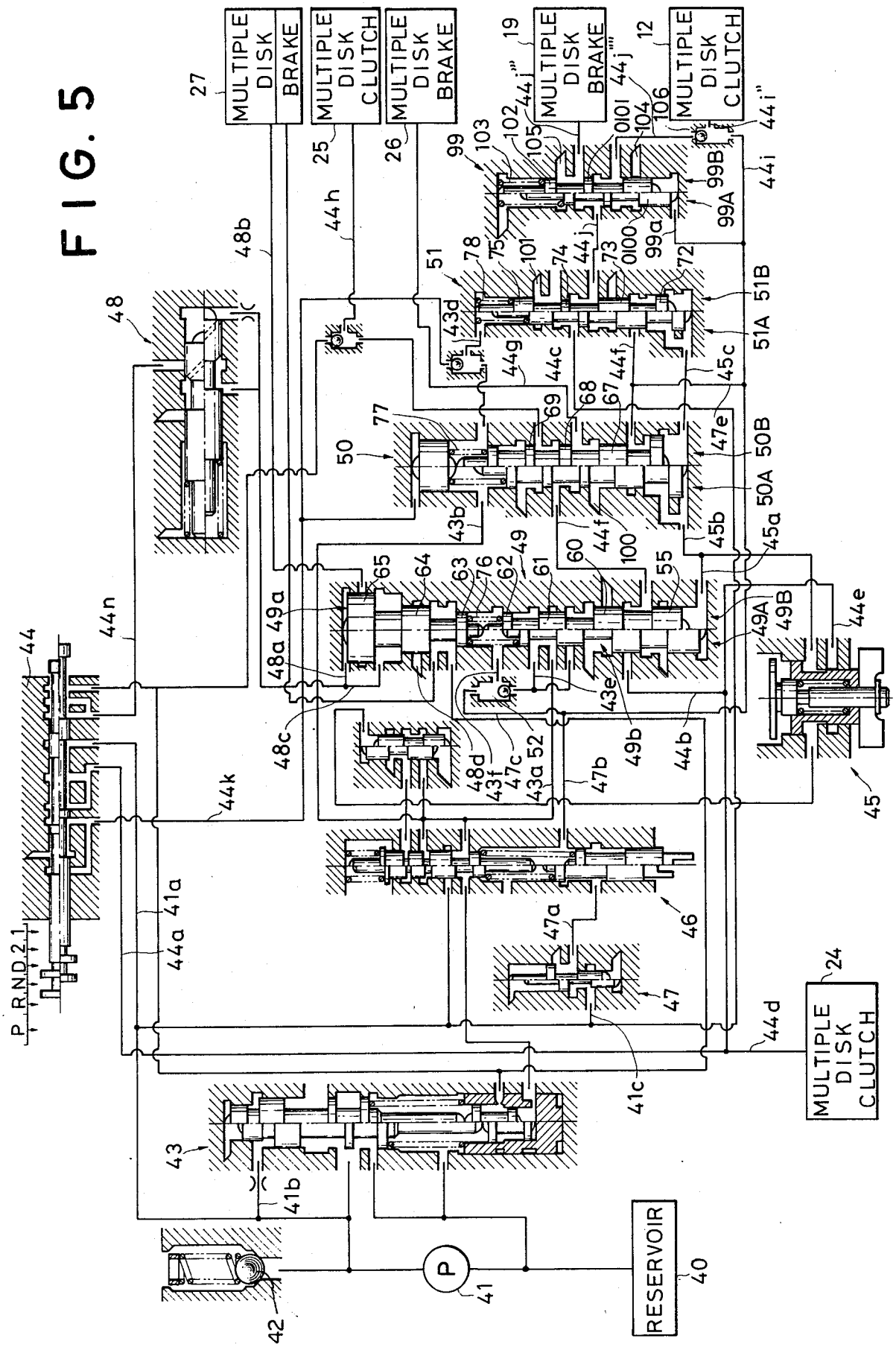

A description will now be provided of the operations of the shift valves 49, 50 in their respective shift positions, while the change-over valve 79 assumes the positions as shown in FIGS. 2 and 3, and a change-over valve 90 assumes a position as shown in FIG. 5.

(1) 1st speed:

When the resultant force of the throttle pressure Pth and the force of spring 76 is greater than the governor pressure Pgo acting on a land 55 of a spool in the 1-2 shift valve 49, the spool in the 1-2 shift valve 49 assumes its lower position 49A depicted to the left of the valve in the drawings. When a resultant force of the throttle pressure Pth and a force of a spring 77 is greater than the governor pressure Pgo acting on a land 66 in the 2-3 shift valve 50, the spool in the 2-3 shift valve 50 assumes a lower position 50A depicted to the left of the valve in the drawing. When a resultant force of the throttle pressure Pth and a force of a spring 78 is greater than the governor pressure Pgo acting on a land 72 in the 3-4 shift valve 51, the spool in the 3-4 shift valve 51 assumes a lower position 51A depicted to the left of the valve in the drawings. As previously described, line pressure is supplied via the line 44d to the clutch 24, while the line 44c is brought into communication with a line 44i through a space between the lands 74 and 75 in 3-4 shift valve 51, and thereby the line pressure acts on the clutch 12, with the other clutches and brakes maintained in released conditions. Thus, first speed may be achieved.

(2) 2nd Speed:

When vehicle speed is increased in 1st speed and, as a result, the governor pressure Pgo is increased, the governor pressure Pgo acting on the land 55 becomes greater than a resultant force of the throttle pressure Pth and a force of the spring 76. Thus, a spool in the 1-2 shift valve 49 assumes an upper position 49B shown to the right of the valve in the drawing. At this time, line pressure in the line 44b is fed through a space defined between the lands 55 and 60 in the 1-2 shift valve 49 into the line 44g, and then to a brake 25, thereby establishing the 2nd speed.

(3) 3rd Speed:

When vehicle speed is increased in 2nd speed, the governor pressure Pgo is further increased, so that the governor pressure Pgo acting on the land 67 becomes greater than a resultant force of the throttle pressure Pth and a force of spring 77. Thus, a spool in the 2-3 shift valve 50 assumes an upper or raised position 50B depicted to the right of the valve in the drawings. At this time, line pressure which has been supplied to the brake 26 is exhausted via a line 44g, then through a space defined between the lands 67 and 69 in the 2-3 shift valve 50, and then through a drain 100 to the outside, so that the brake 26 is released. At the same time, line pressure in the line 44f is fed via a space defined between the lands 68 and 69 in the 2-3 shift valve 50 into a line 44h and then to a clutch 25, thereby establishing the third speed.

(4) 4th Speed (overdrive condition).

When vehicle speed is increased in third speed, the governor pressure is further increased, so that the governor pressure Pgo acting on the land 73 is greater than a resultant force of the throttle pressure Pth and a force of the spring 78. Thus, a spool in the 3-4 shift valve 51 assumes an upper or raised position 51B depicted to the right of the valve in the drawings. At this time, line pressure which has been fed to the clutch 12 is exhausted via the line 44i, then through a space defined between the lands 74 and 75 in the 3-4 shift valve 51 and through a drain 101 to the outside, with the result that line pressure in the line 44c is fed via a space between the lands 73 and 74 in the 3-4 shift valve 51 into the line 44j, and then to a brake 19, thereby establishing the 4th speed, or overdrive condition.

Figure 7:
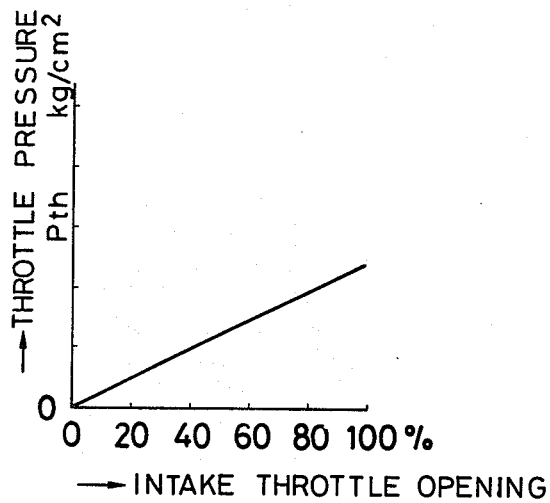
FIG. 7 is a graph plotting throttle pressure against throttle opening.
Figure 8:
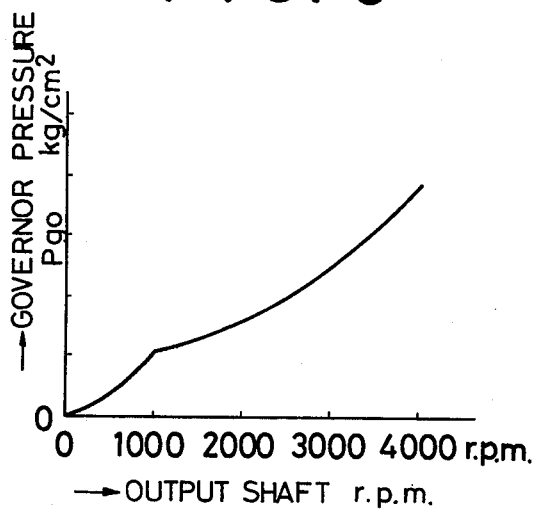
FIG. 8 is a plot showing governor pressure characteristics.
Figure 9:
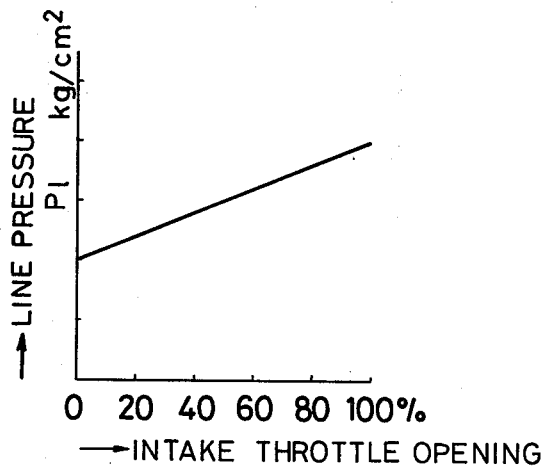
FIG. 9 is a plot showing line pressure characteristics.

In describing the operation of the 1-2 shift valve 49 reference is made to FIG. 7 which shows a plot representing the characteristic of the throttle pressure Pth which has been regulated in the throttle valve 46 to a pressure level commensurate with a throttle opening in a carburetor. FIG. 8 shows a plot representing the governor pressure Pgo which has been regulated by the governor valve 45 to a pressure level commensurate with vehicle speed, and FIG. 9 shows a plot representing a variation in line pressure Pl versus a throttle opening. As shown, the line pressure maintains a given pressure level even at a zero throttle opening, and is so designed as to be increased with an increase in throttle opening.

In a situation (a) with spool 49 shifted from the position 49A to the upper position 49B and in a case (1) with the manual valve 44 set to D-range position manually when there occurs a condition (i) when the throttle opening remains lower than a given value $\alpha$ and the throttle valve 46 does not bring the lines 47a and 47b in communication with each other, then the throttle pressure Pth in the line 43a is fed through a space defined between the lands 61 and 62 in the 1-2 shift valve 49 into a line 43e, and then via a shuttle valve 52 into a line 43f, and then via a line 43f into a space defined between the lands 62 and 63 in the 1-2 shift valve 49. In addition, the governor pressure Pgo is supplied via the line 45a to a space under the land 55 in the 1-2 shift valve 49. In this respect, an uppermost valve 49a in the 102 shift valve 49 is raised upwards by a resultant force of a throttle pressure and a force of the spring 76. Thus, when the valve 49b is shifted upwards, $$A_{62}Pth + W_{76} < A_{55}Pgo \qquad (1)$$

wherein $A_{55}$ and $A_{62}$ represent cross-sectional areas of lands 55, 62 (cm$^2$); Pth represents a throttle pressure (kg/cm$^2$), Pgo represents a governor pressure (Kg/cm$^2$) and $W_{76}$ represents a set load for a spring 76 (kg).

When there occurs a condition (ii) when the throttle opening remains over a given value $\alpha$, and the throttle valve 46 brings the lines 47a and 47b in communication with each other then the detent pressure Pd which has been regulated by the detent regulator valve 47 is fed via lines 47a and 47b and then a line 47c to act on a check ball 52. When the throttle pressure Pth is higher than the detent pressure Pd, then it follows that the throttle pressure Pth acts in the line 43f, thereby establishing the same relationship as given in the formula (1).

In a case (2) where the manual valve 44 is set to the 2nd range position manually the line pressure in the line 41a is fed to lines 44a, 44k, respectively, but not to lines for a D-range, while the line pressure in the line 44k communicated with lines in the 2nd range does not act on the 1-2 shift valve 49, thereby establishing the same formula as in (1).

In a case (3) where the manual valve 44 is set to an L-range position manually, the line pressure in a line 41a is fed to lines 44a, 44k, 44n, respectively. A low modulator pressure PR which has been regulated to a given pressure level by the low modulator valve 48 is fed via the line 44n, then lines 48a, 48c to a space above the land 65 as well as to a space between the lands 65 and 64. At this time, when the spool in the valve 49a is lowered, then the line 48a is brought into communication with the line 48b, and thus the pressure is fed via the line 48b to the brake 27, thereby actuating engine braking for the first speed. At this time, a low modulator pressure is applied to a space above the land 65 alone, while a pressure supplied into a space between the lands 65 and 64 is exhausted through a drain 48d.

Under condition (i) when the throttle opening is below a given value and the throttle valve 46 does not bring the lines 47a and 47b into communication with each other, the throttle pressure Pth and governor pressure Pgo act in a similar manner similar to case (1), condition (i), except that the low modulator pressure PR acts on the land 65. Thus, when a spool in the valve 49a is shifted upwards, $$A_{62}Pth + A_{65}PR < A_{55}Pgo + A_{63}Pth \qquad (2)$$

wherein
$A_{62}$, $A_{65}$, $A_{55}$, $A_{63}$ represent cross sectional areas of lands 62, 65, 55, 63 (cm$^2$)
Pth represents throttle pressure (kg/cm$^2$)
PR represents low modulator pressure (kg/cm$^2$)
Pgo represents governor pressure (kg/cm$^2$), (wherein $A_{65}PR > W_{76}$)

Assume the governor pressure Pgo' at the maximum vehicle speed is derived, taking into consideration the slip of a torque converter and the maximum r.p.m. of an engine at the first speed.

In case a value of $A_{65}PR$ is so determined that $A_{65}Pth + A_{65}PR > A_{55}Pgo' + A_{63}Pth$, then the following relationship will be established at every vehicle speed;

$$A_{65}Pth + A_{65}PR > A_{55}Pgo' + A_{63}Pth.$$

As a result, in the L-range, a spool in the 1-2 shift valve 49 will not assume its upper position.

Under condition (ii) where the throttle opening is over a given value α and the throttle valve 46 brings the lines 47a and 47b in communication with each other, the relationship represented in formula (2) may be achieved for the same reason as given in case (1), condition (ii).

Under a situation (b) when a spool in the valve is shifted from its upper position 49B downwards and where there occurs the case (1) with the manual valve 44 set to D-range position manually under condition (i) when the throttle opening is below the given value α and the throttle valve 46 does not bring the lines 47a and 47b in communication with each other, the throttle pressure Pth in the line 43a is blocked by the land 61 in the 1-2 shift valve 49 and thus does not act on the valve. In addition, the governor pressure Pgo is supplied to a space under the land 55 in the 1-2 shift valve 49 via the line 45a. Accordingly, when a spool in the valve shifts to a lower position, $$W_{76} > A_{55} Pgo \qquad (3)$$

wherein
$W_{76}$ represents a set load for spring 76 (kg)
$A_{56}$ represents cross-sectional area of land 55 (cm$^2$)
Pgo represents governor pressure (kg/cm$^2$)

Under condition (ii) when the throttle opening is over a given value α and the throttle valve 46 brings the lines 47a and 47b in communication with each other, the pressure in the detent line 47a is fed via the shift valve 46 into the line 47b, and fed via the line 47c and shuttle valve 52 into a space defined between the lands 62 and 63 in the 1-2 shift valve. In addition, the governor pressure Pgo acts on a space under the land 55, as in the case of (b) (1) (i). Accordingly, when a spool in the valve assumes a lower position, $$W_{76} + A_{62}Pd > A_{55}Pgo \qquad (4)$$

wherein
$W_{76}$ represents set load for spring 76 (kg)
$A_{62}$, $A_{55}$ represent cross-sectional areas of lands 62, 55 (cm$^2$)
Pgo ... governor pressure (kg/cm$^2$)
Pd ... detent pressure (kg/cm$^2$)

In case (2) where the manual valve 44 is set to 2-range position manually, the same formula (4) may be established both in the 2-range and in the D-range for the same reason as that in situation (a) case (2).

In a case (3) the manual valve 44 is set to L-range position manually and the modulator pressure PR is supplied via the same lines in situation (a), case (3) to a space above the land 65 as well as a space defined between the lands 65 and 64.

In condition (i), when throttle opening is below the given value α, and the throttle valve 46 does not bring the lines 47a and 47b in communication with each other, the throttle pressure Pth does not act on the 1-2 shift valve 49 as in the case of situation (b), case (2), condition (i), except that the low modulator pressure PR acts on the land 65, while the governor pressure Pgo alone acts on the shift valve 49. Thus, when a spool in the 1-2 shift valve 49 (49a + 49b) shifts downwards, $$A_{64}PR > A_{55}Pgo' \qquad (5)$$

wherein
$A_{64}$, $A_{55}$ represent cross-sectional areas of lands 64, 55 (cm$^2$)
PR represents low modulator pressure (kg/cm$^2$)
Pgo' represents governor pressure (kg/cm$^2$)

Under condition (ii) when throttle opening is over the given value α, and the throttle valve 46 brings the lines 47a and 47b in communication with each other, the detent pressure 47a is fed via the throttle valve 46 into the line 47b and via line 47c and shuttle valve 52 into a space defined in the lands 62 and 63 in the 1-2 shift valve 49.

In addition, the detent pressure Pd acts on the land 64, and the governor pressure acts in space under the land 55. As a result, when a spool in the 1-2 shift valve shifts downwards, $$A_{62}Pd + A_{63}Pd > A_{55}Pgo + A_{63}Pd \qquad (6)$$

Table 2 shows the formulae for the 2-3 shift valve and 3-4 shift valve.

the 3-4 shift valve 51, the aforesaid change-over valve 79 being controlled according to throttle pressure. Thus, throttle pressure Pth is supplied through line 79a to a space under the land 80 in the change-over valve 79 as well as to a space defined between the lands 80 and 81 therein. The change-over valve 79 assumes its lower position 79A, thereby shifting the position of a spool in the valve 79 so as to close the supply line 45c of the governor pressure Pgo to the 3-4 shift valve 51. For instance, when a force of the throttle pressure acting on the land 80 is greater than a force of a spring 83, then the

Table 2

| Manual valve position | operation of throttle valve 46 | | 1-2 shift valve 49 (Note 3) | 2-3 shift valve 50 (Note 4) | 3-4 shift valve 51 (Note 5) |
|---|---|---|---|---|---|
| | D-range | (i)inoperable 47a and 47b communicated; (ii)operable, 47a and 47b communicated | $A_{62}Pth+W_{76}<A_{55}Pgo$ (Note 1) ↑ | $A_{70}Pth+W_{77}<A_{67}Pgo$ ↑ | $A_{75}Pth+W_{73}<A_{73}Pgo$ ↑ |
| When a spool in the shift valve shifts upwards | 2-range | (i)inoperable (ii)operable | $A_{62}Pth+W_{76}<A_{55}Pgo$ (Note 6) (Note 1) ↑ | $A_{71}(Pl-Pth)+A_{70}Pth<A_{67}Pgo$ (Note 7) ↑ | $A_{75}Pl+W_{78}<A_{73}Pgo$ (Note 7) ↑ |
| | L-range | (i)inoperable (ii)operable | $A_{62}Pth+A_{65}PR<A_{55}Pgo+A_{63}Pth$ (Note 2) (Note 2) ↑ | ↑ ↑ | ↑ ↑ |
| When a spool valve shifts downwards | D-range | (i)inoperable (ii)operable | $W_{76}>A_{55}Pgo$ $A_{62}Pd+W_{76}>A_{55}Pgo$ | $A_{70}Pth+W_{77}>A_{66}Pgo$ $A_{70}Pth+(A_{66}-A_{67})Pd+W_{77}>A_{66}Pgo$ | $A_{75}Pth+W_{78}>A_{72}Pgo$ $A_{75}Pth+(A_{72}-A_{73})Pd+W_{78}>A_{72}Pgo$ |
| | 2-range | (i)inoperable (ii)operable | $W_{76}>A_{55}Pgo$ $A_{62}Pd+W_{76}>A_{55}Pgo$ | $A_{71}(Pl-Pth)+A_{70}Pth>A_{66}Pgo$ $A_{71}(Pl-Pth)+(A_{66}-A_{67})Pd+A_{70}Pth>A_{66}Pgo$ | $A_{75}Pl+W_{78}>A_{72}Pgo$ $A_{75}Pl+(A_{72}-A_{73})Pd+W_{78}>A_{72}Pgo$ |
| when a spool in the shift valve shifts downwards | L-range | (i)inoperable (ii)operable | $A_{64}PR>A_{55}Pgo$ $A_{62}Pd+A_{64}PR>A_{55}Pgo+A_{63}Pd$ | $A_{71}(Pl-Pth)+A_{70}Pth>A_{66}Pgo$ $A_{71}(Pl-Pth)+(A_{66}-A_{67})Pd+A_{70}Pth>A_{66}Pgo$ | $A_{75}Pl+W_{78}>A_{72}Pgo$ $A_{75}Pl+(A_{72}-A_{73})Pd+W_{78}>A_{72}Pgo$ |

(Note 1) At a throttle opening over a given value, at which the throttle valve 46 is operable, Pd<Pth.
(Note 2) A65PR is set in a manner that $A_{62}Pth+A_{65}PR>A_{55}Pgo+A_{63}Pth$ at the governor pressure Pgo' at a maximum vehicle speed obtained at the 1st speed, and a spool in the shift valve will not shift upwards in the L-range.
(Note 3) There is no difference in cross-sectional area between the lands 61 and 62, and lands 55 and 69 in the 1-2 shift valve 49, respectively.
(Note 4) There is no difference in cross-sectional area among the lands 67, 68, 69, 70 in the 2-3 shift valve 50.
(Note 5) There is no difference in cross-sectional area among the lands 73, 74, 75 in the 3-4 shift valve.
(Note 6) $A_{71}$ is set in a manner that the relationship, $A_{71}(Pl-Pth)+A_{70}Pth>A_{67}l$ Pgo″, may be maintained all the time, at a governor pressure Pgo″ at a maximum vehicle speed obtained at the 2nd speed, and a spool in the shift valve will not shift upwards in 2nd and L-ranges. (Pgo″≦Pl)
(Note 7) $A_{75}Pl+W_{78}$ is set in a manner that the relationship $A_{75}Pl+W_{78}>A_{73}Pgo''$ may be maintained all the time at a governor pressure Pgo″ at a maximum vehicle speed obtained at the 2nd speed, and a spool in the shift valve will not shift upwards in 2nd and L-ranges. (Pgo″≦Pl) wherein Ai represents cross-sectional area of land i(cm$^2$)
Wj represents set load for spring j(kg)
Pth represents throttle pressure (kg/cm$^2$)
Pl represents line pressure (kg/cm$^2$)
Pgo represents governor pressure (kg/cm$^2$)
Pd represents detent pressure (kg/cm$^2$)
PR represents low modulator pressure (kg/cm$^2$)

When a governor pressure is increased as shown above, a spool in the 3-4 shift valve 51 shifts upwards, (at 51B in FIG. 2), thereby supplying pressure to the brake 19. As a result, the transmission for a vehicle provides the highest speed condition, i.e., an overdrive condition, and the drive force will be minimized. When a spool in the 3-4 shift valve 51 remains in the lower position (51A), the supply of pressure to the brake 19 is interrupted, and the highest speed condition is no longer provided.

As is apparent from the foregoing, a shift valve control means is provided in the aforesaid hydraulic system, in a manner that a spool in the 3-4 shift valve may remain in a lower position at throttle openings over a given value, thereby precluding automatic gear shifting to the highest speed gear-shift position, so that a gear shift position, which is downshifted from the highest speed gear shift position, may be used for acceleration.

FIG. 2 shows the first embodiment of the hydraulic control system according to the present invention. In this embodiment, a change-over valve 79 is provided between governor pressure supply lines 45c and 45c' to spool in the change-over valve 79 shifts to its upper position 79B, so that the governor-pressure supply line 45c is closed and a spool in the 3-4 shift valve 51 shifts to its lower position 51A, and as a result, a governor pressure is not supplied to the brake 19. This prevents the transmission from assuming the highest speed gear shift position. As has been shown in FIG. 2, a given hysteresis characteristic may be provided for the shifting of a spool in the change-over valve 79 by providing different outer diameters for the lands 80 and 81.

The description will now refer to the operation of the change-over valve 79 in the first embodiment shown in FIG. 2, with reference to the formulae previously set forth.

In condition (i) with throttle pressure increased and the spool in the change-over valve 79 shifted from the lower position 79A upwards $$A_{81}Pth > W_{83}$$

wherein

A81 represents the cross-sectional area of land 81 (cm²)
W83 represents set load for a spring 83 (kg)
Pth represents throttle pressure (kg/cm²)
(There is no difference in cross-sectional area between the lands 81 and 82.)

At this time, the line 45c is closed and the 3-4 shift valve 51 remains in the condition 51A in FIG. 2, and thus is not communicated with the brake 19.

In condition (ii) the spool in the shift valve 79 shifts from its upper position downwards:

$$A_{82}Pth < W_{83},$$

wherein A82 represents cross sectional area of land 81 (cm²) and the other factors are the same as those in condition (i).

When the change-over valve 79 assumes its lower position 79A, the governor pressure Pgo is fed via the line 45c and then via a space defined between the lands 81 and 82 in the change-over valve 79 into the line 45c' and then to the shift valve 51, so that the operation of the shift valve 51 remains unchanged.

When the spool in the change-over valve 79 assumes its upper position 79B, then the line 45c is closed by means of the land 81 in the change-over valve 79, while the governor pressure Pgo which has been supplied to the 3-4 shift valve 51 is exhausted via the line 47f and a space between the lands 81 and 82 in the change-over valve 79, with the result that governor pressure is not supplied to the 3-4 shift valve 51, and the spool in the 3-4 shift valve assumes its lower position 51A.

Figure 10:
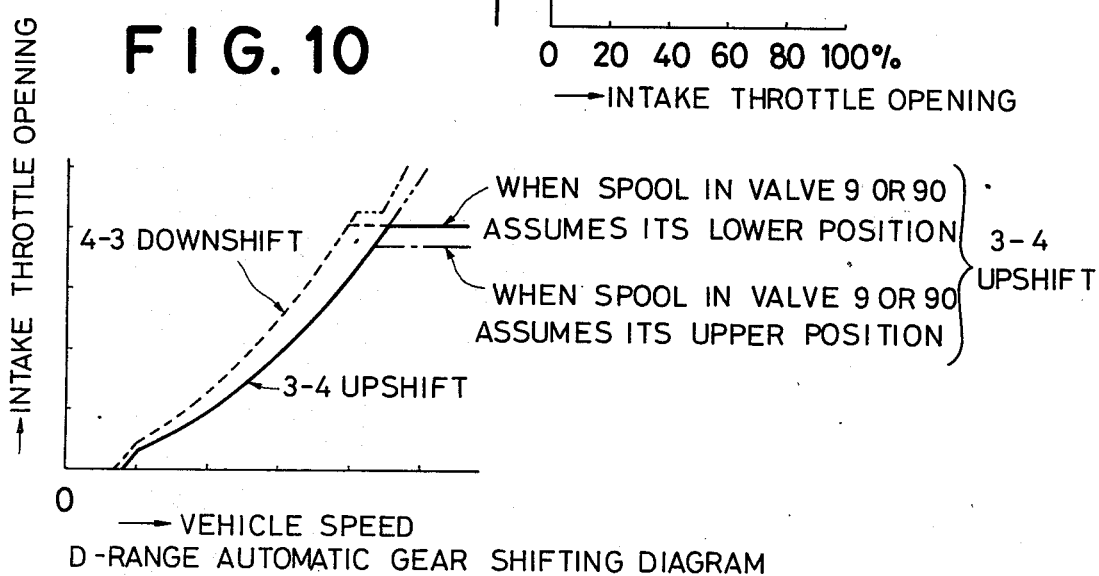
FIGS. 10 to 12 are plots showing automatic gear shifting in various embodiments of the present invention.

FIG. 10 shows a D-range automatic gear shifting diagram in the first embodiment of the invention.

FIG. 3 shows the second embodiment of the invention. The second embodiment differs from the first in that a lowermost land 86 in the change-over valve 85 has a uniform outer diameter over the entire length thereof, unlike the change-over valve 79 in the first embodiment. The arrangement of the change-over valve 85 is the same as that shown in the first embodiment. A throttle pressure Pth is supplied via the line 85a to a space under the land 86 in the change-over valve 85 or a detent pressure Pd is supplied via the throttle valve 46 thereto, so that a spool in the change-over valve 85 is shifted upwards or downwards according to a balancing relationship between the aforesaid two pressures acting on the land 86 and a force of a spring 88, thereby opening or closing the communication between the governor-pressure (Pgo) supply lines 45c and 45c'' leading to the 3-4 shift valve 51. When the throttle pressure Pth is increased and the change-over valve 85 assumes its upper position 85B, then the governor pressure supply lines 45c and 45c'' are closed. In the second embodiment, because of the freedom of a difference in outer diameter of the land 86, no hysteresis characteristic is provided for the shifting of the spool.

The operation of the change-over valve 85 may be expressed by formulae set forth below.

In the case (1) when the supply pressure is the throttle pressure Pth and with condition (i) when the spool in the change-over valve 85 shifts from the lower position 85A upwards $$A_{86}Pth > W_{88}$$

When, under condition (ii), the spool in the change-over valve 85 shifts from its upper position 85B downwards;

$$A_{86}Pth < W_{88}$$

wherein
A86 represents cross-sectional area of the land 86 (cm²)
W88 represents a set load for spring 88 (kg)
Pth represents throttle pressure (kg/cm²)
(There is no difference in cross-sectional area between lands 86 and 87.)

In case (2) when the supply pressure is the detent pressure Pd, the detent pressure Pd is regulated to a given value in the detent regulator valve 47, so that the throttle valve 46 is actuated at throttle openings over a given value α, thereby bringing the lines 47a and 47b in communication with each other.

A86 and 88 are so set that $A_{86} Pd > W_{88}$, when the detent pressure Pd is applied via the line 47f to a space under the land 86 in the change-over valve 85. Thus, when the change-over valve 46 is actuated, then the spool in the change-over valve 85 shifts upwards. When the change-over valve 46 does not bring the lines 47a and 47b in communication with each other, then the detent pressure Pd can no longer act on the change-over valve 85 so as to maintain the spool thereof in its lower position.

Figure 11:
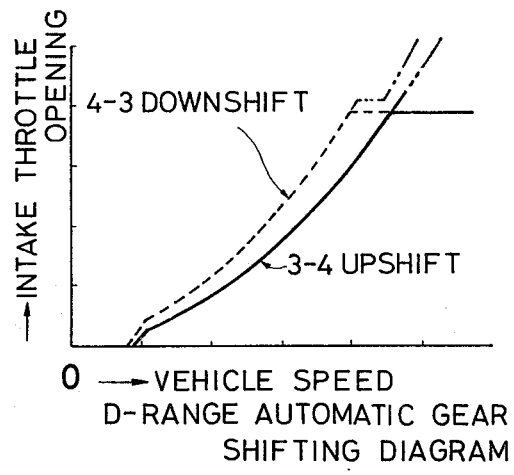

The operation of the change-over valve 85 is the same as that in the first embodiment, except for the freedom of hysterisis characteristic. FIG. 11 shows an automatic gear shifting diagram of the second embodiment.

Figure 4:
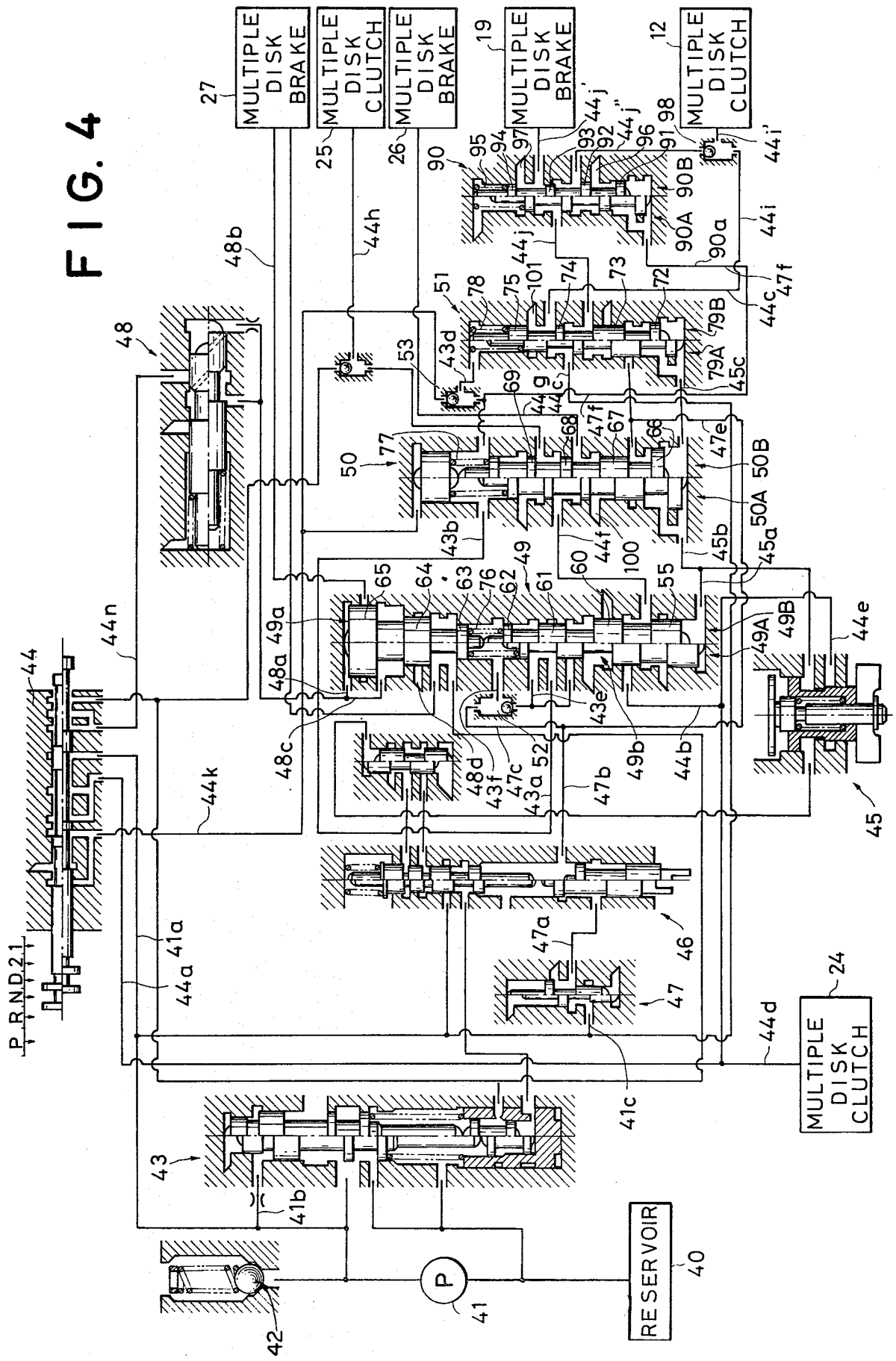

FIG. 4 shows the third embodiment of the invention. In this embodiment, a change-over valve 90 is provided between the 3-4 shift valve 51 and the pressure supply line 44j, and a shuttle valve 98 is provided for changing over the fluid path between the lines 44i and 44j''. In the change-over valve 90, a throttle pressure Pth is supplied through a line 90a to a space under the land 91 and a space defined between the lands 91 and 92 when the spool in the change-over valve 90 assumes the lower position. Thus, the change-over valve 90 may change over the connection of the line 44j with the line 44j' to its connection to the line 44j'', thereby changing over the path of line pressure between the brake 19 and the clutch 12. In this case, by providing different outer diameters for the lands 91 and 92 as in the first embodiment, a hysteresis characteristic may be afforded to the shifting of the spool.

The operation of the change-over valve 90 in the third embodiment may be expressed by the following formulae.

In condition (i), when the spool in the change-over valve 90 shifts from its lower position 90A upwards:

$$A_{92}Pth > W_{95}$$

wherein
A92 represents cross-sectional area of land 92 (cm²)
W95 represents set load for spring 95 (kg)
Pth represents throttle pressure (kg/cm²)
(There is no difference in cross-sectional area between lands 92, 93, 94).

In condition (ii) when the spool in the change-over valve 90 shifts from its upper position 90B downwards:

$$A_{91}Pth < W_{95}$$

wherein
A91 represents cross-sectional area of land 91 (cm²)

The other factors are the same as those in (i).

In case the spool in the 3-4 shift valve assumes its upper position, and a line pressure prevails in the line 44j, when the spool in the change over valve 90 assumes its lower position 90A, then a line pressure in the line 44j is fed through a space between the lands 93 and 94 into the line 44j, thereby allowing the supply of a line pressure to the brake 19, thus establishing the 4th speed or overdrive condition. When the spool in the change-over valve 90 assumes its upper position 90B, a line pressure in the line 44j is fed through a space between the lands 92 and 93 into the line 44j'', then via the shuttle valve 98 into the line 44', and then to the clutch 12. At this time, pressure which has been supplied to the brake 19 is exhausted through a space between the lands 93 and 94 through a drain 97 outside, thus establishing the third speed. When a spool in the 3-4 shift valve 51 assumes its lower position and a line pressure prevails in the line 44i, (the 3rd speed drive), then the line 44i is communicated via the shuttle valve 98 with the line 44i', so that a line pressure may be supplied to the clutch 12, irrespective of the operation of the change-over valve 90, thus establishing the third speed. FIG. 10 shows the automatic gear shifting diagram in the third embodiment.

FIG. 5 shows the fourth embodiment of the invention. The fourth embodiment according to the present invention differs from the third in that there is no difference in outer diameter in a lowermost land 0100 in a change-over valve 99. The arrangement of the change-over valve 99 is the same as that of the third embodiment. More particularly, the change-over valve 99 is provided between the line 44j leading from the 3-4 shift valve 51 and the line 44j''' leading to the brake 19, and a check ball valve 106 is provided for changing over the fluid path between the lines 44i and 44j''''. A throttle pressure Pth is supplied via a line 99a and a space under the land 0100 so as to act on the land 0100, or a detent pressure Pd supplied via the throttle valve 46 is supplied to the land 0100, thereby shifting the spool in the change-over valve 99 to its upper or lower position, depending on a balancing relationship being established between the aforesaid pressure acting on the land 0100 and a force of a spring 103, thus changing over the connection of the line 44j with the line 44j''' to its connection with the line 44j'''' for changing over the path of line pressure between the brake 19 and the clutch 12. In this case, as in the second embodiment, there is no hysteresis characteristic in the shifting of the spool in the change-over valve 99.

The operation of the change-over valve in the fourth embodiment may be represented by the following formulae:

In a case (1) where the supply pressure is a throttle pressure and under condition (i) when the spool in the change-over valve 99 shifts from its lowered position 99A upwards:

$$A_{0100}P_{th} > W_{103}$$

Under condition (ii) the spool in the change-over valve 99 shifts from its upper position 99B downwards:

$$A_{0100}P_{th} < W_{103}$$

wherein $A_{0100}$ represents cross-sectional area of land 0100 (cm$^2$)
$W_{103}$ represents set load for spring 103 (kg)
Pth represents throttle pressure (kg/cm$^2$)

(There is no difference in cross-sectional area between the lands 0101 and 102).

In case (2), the supply pressure is a detent pressure, and then as is clear from the description of the second embodiment;

$$A_{0100}P_d > W_{103}$$

FIG. 11 is an automatic gear-shifting diagram in the fourth embodiment, as in the second embodiment.

Figure 6:
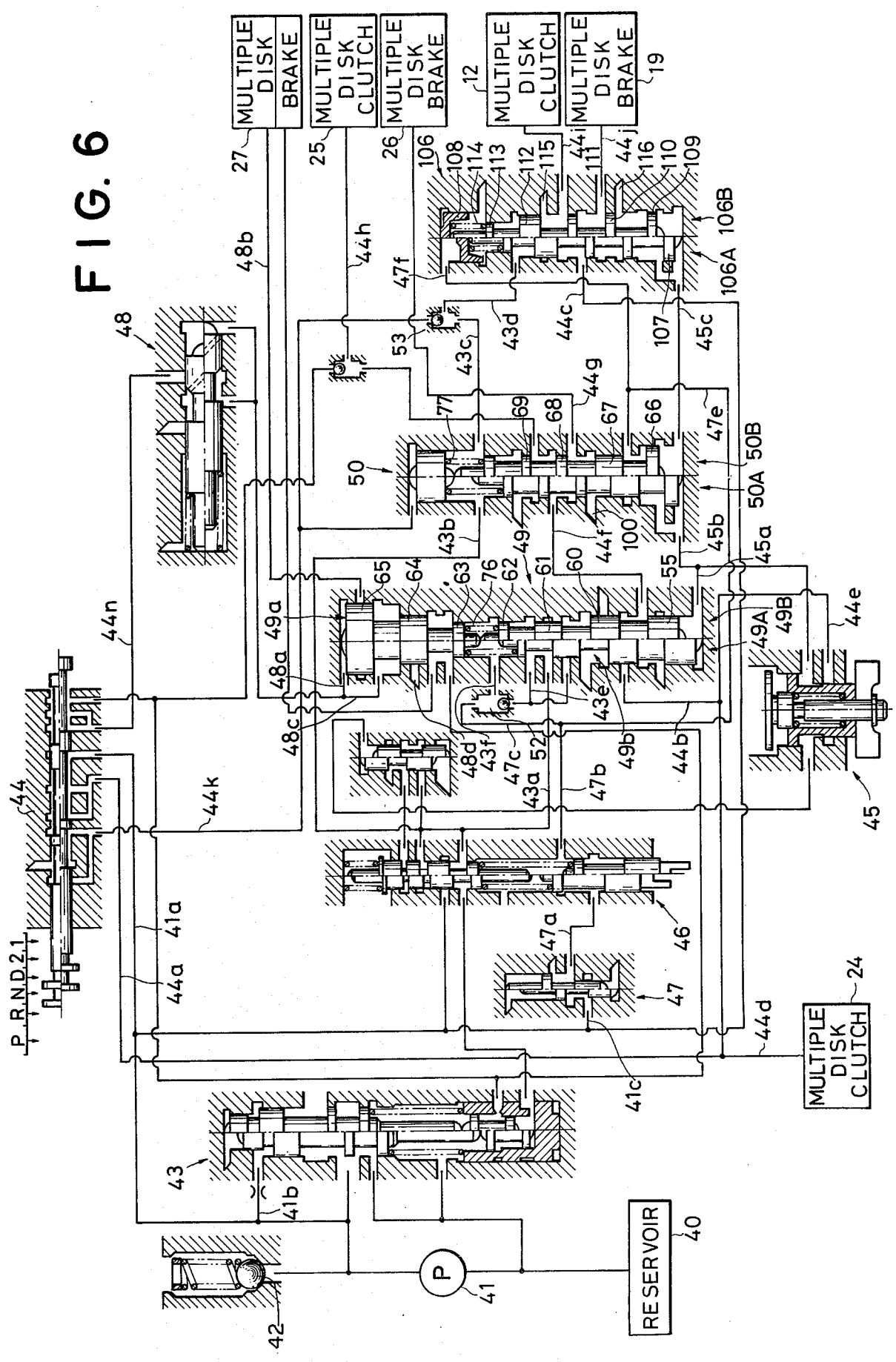

FIG. 6 shows still another embodiment of the invention. In this embodiment, there is provided a 3-4 shift valve 106 in place of the 3-4 shift valve 51. Unlike the 3-4 shift valve 51, a sleeve 108 is placed above the top of the spool in the shift valve 106, as shown, for increasing the area, on which the detent pressure Pd acts, and in addition, there is provided a land 113 for increasing an area, on which the throttle pressure Pth acts. A spool in the 3-4 shift valve 106 is so designed as to be lowered, when the detent pressure Pd acts. As a result, when the throttle valve 46 is actuated at throttle openings over a given value, and then the detent pressure Pd acts via the line 47f on the sleeve 108, then a spool in the 3-4 shift valve 106 is lowered, as shown at 106A in FIG. 6. In this case, the line pressure is fed from the line 44c to the clutch 12, while the path to the brake 19 is closed. In this embodiment, there is no need to provide a separate change-over valve unlike the second to fourth embodiments, but it suffices to modify the shape of the 3-4 shift valve and to additionally provide a sleeve. In addition, a throttle opening may be arbitrarily set to achieve the aforesaid condition by changing the outer diameter of the sleeve.

The operation of the 3-4 shift valve in this embodiment may be represented by the following formulae: In the 2nd- and L-ranges, the 3-4 shift valve does not shift its spool, as shown in Table 2. Thus, the description will refer only to the "D"-range herein as shown in Table 3 below:

Table 3

|  | In case 3 - 4 shift valve shifts its spool upwards | In case 3 - 4 shift valve shifts its spool downwards |
|---|---|---|
| Throttle valve 46 is not operated (no communication between 47a and 47b.) | $(A_{112} - 113)P_{th} + W_{114}$ <br> $> A_{110}P_{go}$ | $(A_{112} - 113)P_{th} + W_{114}$ <br> $> A_{109}P_{go}$ |
| Throttle valve 46 is operable (communication between 47a and 47b) | $(A_{112} - 113)P_{th} + A_{108}P_d$ <br> $> A_{110}P_{go}$ <br> $(A_{108}P_d > W_{114})$ | $(A_{112} - 115)P_{th} + A_{108}P_d$ <br> $> A_{109}P_{go}$ | wherein
Ai ... cross sectional area of land i (cm$^2$)
$W_{114}$ ... a set load for spring 114

Pth ... throttle pressure (kg/cm²)
Pgo ... governor pressure (kg/cm²)
Pd ... detent pressure (kg/cm²)

In this respect, when the change-over valve 46 is actuated and a detent pressure acts on the 3-4 shift valve 106, the governor pressure is lower than the line pressure. Thus, A108 is set so as to establish the following relationship:

$$(A_{112}-A_{113})Pth + A_{108}Pd > A_{109}Pgo \qquad (10)$$

In this case $A_{109} > A_{110}$, so that a spool in the 3-4 shift valve will not shift to its upper position, but may be maintained in its lower position at all times.

FIG. 11 shows an automatic gear shifting diagram for this embodiment, as in the second and fourth embodiments.

Figure 12:
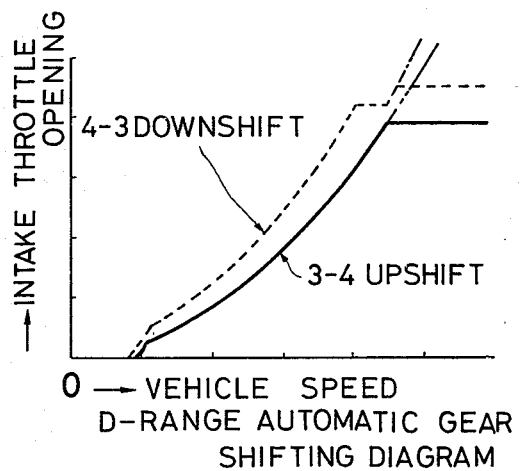
Figure 13:
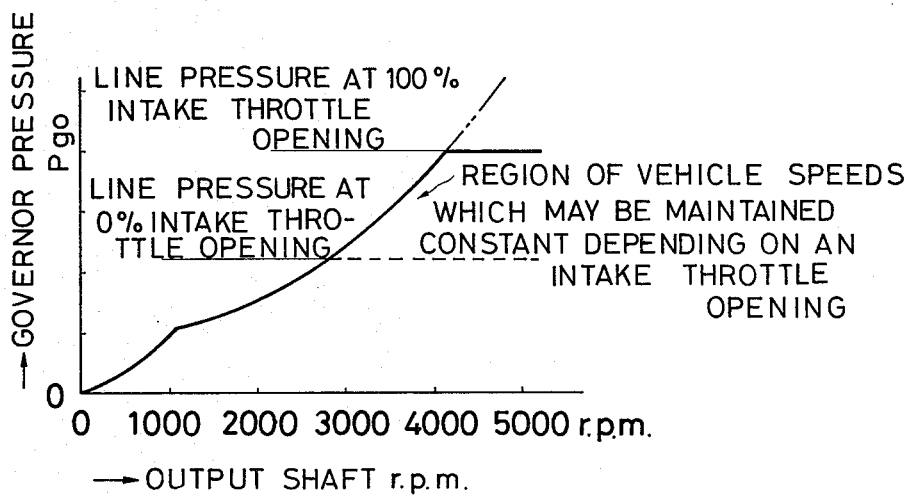
FIG. 13 is a plot showing the governor pressure characteristics of the sixth embodiment of the invention.

For precluding automatic gear shifting of the transmission to its highest speed gear shift position at throttle openings over a given value, the 3-4 shift valve may alternatively be so arranged that its operation is set to a vehicle speed which cannot be detected at throttle openings over a given value, by maintaining a governor pressure constant at vehicle speeds over a given value, by varying the level of a governor pressure or lowering the line pressure. The governor pressure may be achieved by regulating the line pressure Pl by the governor valve 45. As shown in FIG. 13, the governor pressure remains lower than the line pressure Pl commensurate with throttle opening, while the governor pressure remains constant at vehicle speeds over a given value (the speed at which the governor pressure becomes equal to the line pressure Pl). By utilizing the characteristic above, when the respective lands, springs and the like are determined so as to obtain the relationship, $A_{75}Pth + W_{78} > A_{73}Pl$ at a given throttle opening, rather than the relationship, $A_{75}Pth + W_{78} < A_{73}Pgo$ which represents the upward shifting of a spool in the 3-4 shift valve 51 as shown in Table 2, then a spool in the 3-4 shift valve 51 will not shift upwards at throttle openings over a given opening $\beta$. As a result, the communication to the brake 19 is blocked, thus precluding the gear shifting to a highest speed gear shift position (overdrive). FIG. 12 shows the automatic gear shifting diagram for D-range in this embodiment.

While the present invention has been described herein with reference to certain exemplary embodiments thereof, it should be understood that various changes, modifications, and alterations may be effected without departing from the spirit and the scope of the present invention, as defined in the appended claims.

What is claimed is:

1. A hydraulic control system for use in an automatic transmission of a vehicle with an internal combustion engine having a throttle, said transmission including a fluid type converter and a gear system provided with a plurality of frictional engaging means for deriving a plurality of speed ratios through said transmission, said system comprising:
    a hydraulic fluid pressure source;
    a line pressure control valve for generating in said system a regulated line pressure from said hydraulic fluid pressure source;
    a throttle pressure control valve responsive to the setting of said throttle for generating in said system a throttle pressure determined by the position of said throttle;
    a governor pressure control valve responsive to the speed of said vehicle for generating in said system a governor pressure commensurate with the vehicle speed;
    a manual valve for manually changing the fluid path through said control system to enable setting of a predetermined transmission operating condition;
    a plurality of shift valves including one shift valve designated to establish the highest speed condition for said transmission, said shift valves operating to control the path of fluid pressure supplied to said frictional engaging means, thereby to control operation of said frictional engaging means in accordance with a balancing of the relationship between said throttle pressure and said governor pressure; and
    highest speed control means for shifting to a low-speed side position said one shift valve designated to establish the highest speed condition irrespective of the level of said governor pressure.

2. A hydraulic control system as set forth in claim 1, wherein said highest speed control means is provided with a change-over valve controlled by said throttle pressure, said change-over valve operating at throttle openings over a given value to interrupt the supply of said governor pressure to said shift valve designated to establish the highest speed.

3. A hydraulic control system as set forth in claim 1, wherein said highest speed control means is provided with a change-over valve controlled by a detent pressure, and adapted to interrupt the supply of said governor pressure to said shift valve designated to establish the highest speed, when said detent pressure is supplied.

4. A hydraulic control system as set forth in claim 1, wherein said highest speed control means is provided with: a high speed frictional engaging means and a low speed frictional engaging means which are under the control of said shift valve designated to establish the highest speed; and a change-over valve for changing over the supply of line pressure between said high speed frictional engaging means and said low speed frictional engaging means in response to the said throttle pressure, said line pressure being supplied via said shift valve.

5. A hydraulic control system as set forth in claim 1, wherein said highest speed control means is provided with a high speed frictional engaging means and a low speed frictional engaging means which are under the control of said shift valve designated to establish the highest speed and a change-over valve for changing over the supply of line pressure between said highest speed frictional engaging means and said low speed frictional engaging means in response to a detent pressure, said line pressure being supplied via said shift valve.

6. A hydraulic control system as set forth in claim 1, wherein said highest speed control means is provided with said shift valve designated to establish the highest speed, with said governor pressure and said throttle pressure acting on the spool in said shift valve in opposite directions, said shift valve including a sleeve adapted to abut the top of said spool therein, and receive a detent pressure for supplementing a force of said throttle pressure, when said intake throttle opening is over a given value.

7. A hydraulic control system for use in an automatic transmission which includes a plurality of frictional engaging means for deriving a plurality of speed ratios, comprising:
    a hydraulic fluid pressure source;

a line pressure control valve for generating a regulated line pressure from said hydraulic fluid pressure source;
a throttle pressure control valve for generating a throttle pressure commensurate with the opening of an intake throttle;
a governor pressure control valve for generating a governor pressure commensurate with a vehicle speed;
two or more shift valves for changing over the supply of a line pressure to said frictional engaging means, depending on a balancing relationship between said throttle pressure and said governor pressure;
said shift valves including one shift valve adapted to establish the highest speed operating to assume a low-speed-side shift position at vehicle speeds over a given value as well as at intake throttle openings over a given value by providing a governor pressure which is constant at vehicle speeds over a given value in place of a governor pressure which is responsive to vehicle speeds over a given value.

* * * * *